United States Patent
Ducloux et al.

(10) Patent No.: US 7,577,196 B2
(45) Date of Patent: Aug. 18, 2009

(54) DEVICE AND METHOD FOR CODING VIDEO DATA

(75) Inventors: Xavier Ducloux, Rennes (FR); Patrice Alexandre, Cesson Sevigne (FR); Ludovic Noblet, Betton (FR)

(73) Assignee: Thomson Licensing, Boulogne Billancourt (FR)

( * ) Notice: Subject to any disclaimer, the term of this patent is extended or adjusted under 35 U.S.C. 154(b) by 728 days.

(21) Appl. No.: 10/884,158

(22) Filed: Jul. 2, 2004

(65) Prior Publication Data
US 2005/0117644 A1  Jun. 2, 2005

(30) Foreign Application Priority Data
Jul. 4, 2003  (FR)  .................................. 03 08154

(51) Int. Cl.
 H04B 1/66 (2006.01)
 H04N 7/12 (2006.01)
 H04N 11/02 (2006.01)
 H04N 11/04 (2006.01)

(52) U.S. Cl. ........................... 375/240.01; 375/240.12; 375/240.13; 375/240.14; 375/240.15; 375/240.16

(58) Field of Classification Search ............ 375/240.01, 375/240.12–240.17, 12–17
See application file for complete search history.

(56) References Cited

U.S. PATENT DOCUMENTS

| | | | | |
|---|---|---|---|---|
| 5,347,309 A | * | 9/1994 | Takahashi | 375/240.12 |
| 5,506,844 A | * | 4/1996 | Rao | 370/468 |
| 5,652,629 A | * | 7/1997 | Gonzales et al. | 348/699 |
| 5,682,204 A | * | 10/1997 | Uz et al. | 375/240.15 |
| 5,784,107 A | * | 7/1998 | Takahashi | 375/240.14 |
| 6,108,039 A | * | 8/2000 | Linzer et al. | 375/240.11 |
| 6,259,733 B1 | * | 7/2001 | Kaye et al. | 375/240 |
| 6,272,177 B1 | * | 8/2001 | Murakami et al. | 375/240.03 |
| 7,020,200 B2 | * | 3/2006 | Winger | 375/240.16 |
| 2003/0053538 A1 | | 3/2003 | Katasvounidis et al. | 348/700 |
| 2003/0215216 A1 | * | 11/2003 | Hashimoto et al. | 386/68 |

FOREIGN PATENT DOCUMENTS

| | | |
|---|---|---|
| EP | 0 782 344 A2 | 12/1996 |
| EP | 1 081 959 A1 | 9/1999 |
| FR | 2 764 156 A1 | 5/1997 |

* cited by examiner

*Primary Examiner*—Marsha D Banks Harold
*Assistant Examiner*—Chikaodili E Anyikire
(74) *Attorney, Agent, or Firm*—Robert D. Shedd; Robert B. Levy

(57) ABSTRACT

The invention relates to a device for coding video frame sequences, comprising
 means (1) for measuring the spatial activity of the video frames to be coded,
 means (1) for measuring the temporal activity of the video frames to be coded,
 means (2) for coding the frames as a frame structure or as a field structure.

According to the invention, the means (2) for coding the frames as a frame structure or as a field structure are able to choose the field or frame structure dynamically as a function of the measurements of spatial and temporal activity of the said frame.

4 Claims, 3 Drawing Sheets

Current frame

DEVICE AND METHOD FOR CODING VIDEO DATA

BACKGROUND OF THE INVENTION

The invention applies more particularly to the coding of interlaced frames, that is to say those composed of two fields sampled at distinct instants.

The coding of video frames is necessary for the transmission of digital video data in limited bandwidth networks as well as for applications where storage constitutes a limit.

The compression of digital video data without significant degradation of quality is possible when the video sequences display a high degree of spatial redundancy, of spectral redundancy, of temporal redundancy, of psycho-visual redundancy.

In the course of the last few years, interest in respect of multimedia has led to the emergence of new compression standards and has seen the development of standards such as MPEG-2 and more recently H.264 defined under the reference: ITU-T Rec. H.264|ISO/IEC 14496-10 AVC.

These standards are aimed at a vast gamut of applications with varied demands with regard to bit rate, to frame quality, to complexity, to resilience to error and to timescale as well as to the improvement of compression ratios.

The H.264 compression standard has introduced, mirroring what was done in MPEG-2, the notion of frame coding structure interlacing the lines of the frame or field separating two fields of the frame.

The field or the frame consists of horizontal rows, each containing sixteen lines of pixels. In each row there are macroblocks, each being of dimensions 16*16. A macroblock is organized as four luminance blocks and as 2, 4 or 8 chrominance blocks depending on the type of sampling.

In a compression scheme formatting the data in frame mode in a macroblock, the two fields remain interlaced in a common block. In the field type coding mode, the two fields are separated in the macroblock: one block corresponds to the even field and another corresponds to the odd field.

The H.264 standard also includes the known types of frame defined in the MPEG-2 standard, namely:

I (intra) frames whose coding does not depend on any other frame,

P (predictive) frames whose coding depends on previously received frames,

B (bi-predictive) frames which depend on frames received previously and/or subsequently. The group of frames between two I frames is called a GOP (standing for "Group of Pictures"), its size is variable and its internal structure in terms of frame type is also free.

The reference model of the H.264 standard has made the choice of so-called a-posteriori coding, that is to say after post-coding of the frame in the frame or field structures. The coding which provided the best bit rate/distortion compromise is adopted.

Such a mode of coding is hardly conceivable for real-time applications since it is too expensive in terms of time or calculation means: it necessitates the calculation of frame structure field predictions, frame structure frame predictions, field structure field predictions, i.e. three times as many calculations as the coding of a progressive source (frame structure frame predictions) which is already critical for a standard television format in the current state of the art.

Moreover, the reference model of the standard implements a fixed GOP structure, this not guaranteeing that the choice of coding, although made in a-posteriori mode, will make it possible to obtain the best coding in terms of bit rate/distortion compromise.

BRIEF SUMMARY OF THE INVENTION

The present invention proposes a coding device in which the choices of coding in field or frame mode are carried out before coding.

For this purpose, the invention proposes a device for coding video frame sequences, comprising
 means for measuring the spatial activity of the video frames to be coded,
 means for measuring the temporal activity of the video frames to be coded,
 means for coding the frames as a frame structure or as a field structure.

According to the invention, the means for coding the frames as a frame structure or as a field structure are able to chose the field or frame structure dynamically as a function of the measurements of spatial and temporal activity of the said frame.

The invention can enable a reduction in the number of calculations of 30 to 60% with respect to the approach of the reference model. This optimization of the calculations is not done to the detriment of coding quality: the invention is more particularly aimed at applications of high coding quality.

According to a preferred embodiment, the coding means being able to code the video sequences in the form of groups of pictures, the said device comprises means for choosing the structure of the group of pictures (GOP) as a function of the measurements of spatial and temporal activity.

In this way, the sequences exhibiting weak temporal activity can be coded using groups of pictures comprising bigger consecutive B frame sequences than the sequences exhibiting strong temporal activity.

The coupling of the choice of the frame/field coding structure and of the GOP structure can make it possible to exceed the performance of the reference model of the standard.

In a preferred embodiment, the device comprises means for deciding whether the video sequences are of interlaced type or of progressive type.

In this way, this enables a frame sequence of progressive type to be coded as a frame structure. Specifically, the progressive sequences exhibit a strong spatial correlation and it is therefore preferable to code them as a frame structure.

According to a preferred embodiment, the groups of pictures comprising frames coded in intra mode, in predictive mode and in bi-predictive mode, the frames of bi-predictive type are able to serve as reference frame for the coding of certain frames of the group of pictures.

Preferably, the groups of pictures are able to comprise sequences composed of any number of consecutive frames coded in bi-predictive mode.

This is particularly beneficial in the case of sequences exhibiting weak temporal activity, the coding in bi-predictive mode being fairly inexpensive.

According to a preferred embodiment, when the input sequence is of interlaced type, the frames of type I are coded as a field structure, the second field of the frame becoming a field of type P (predictive) with respect to the first field of the frame.

This may enable a reduction in the coding costs and therefore an improvement in the coding bit rate.

The invention also relates to a method of coding video data, comprising the steps of:

measuring the spatial activity of the video frames to be coded, measuring the temporal activity of the video frames to be coded, coding the frames as a frame structure or as a field structure.

According to the invention, the coding of the frames as a frame structure or as a field structure dynamically chooses a field or frame structure as a function of the measurements of spatial and temporal activity of the said frame.

The invention also relates to a computer program product, characterized in that it comprises program code instructions able to implement the method according to the invention when the program is executed on a computer.

BRIEF DESCRIPTION OF THE DRAWINGS

The invention will be better understood and illustrated by means of wholly nonlimiting, advantageous exemplary embodiments and modes of implementation, with reference to the appended figures in which.

DETAILED DESCRIPTION OF THE INVENTION

Figure 1:
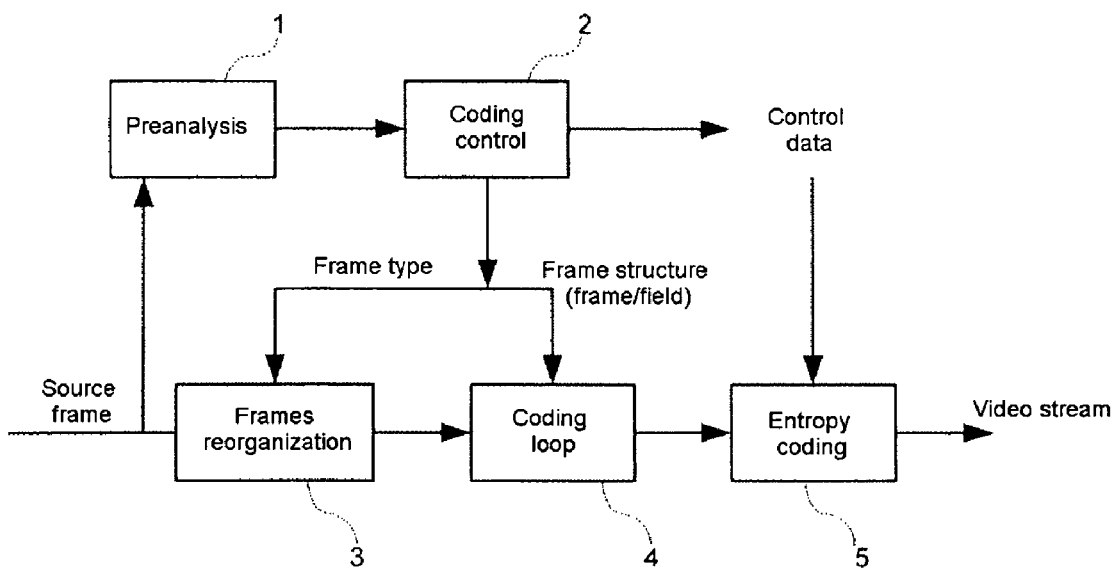
FIG. 1 represents a coding device according to a preferred embodiment of the invention.

FIG. 1 represents a coding device according to the preferred embodiment. The coding device comprises a preanalysis module 1 which receives as input the frame sequences originating from the video stream to be coded. The video stream is also transmitted to the input of a module 3 for reorganizing the frames.

The output of the frames reorganization module 3 is connected to the input of a coding loop 4 whose output is connected to an entropy coding module 5 which delivers the coded video data stream as output.

The preanalysis module 1 is connected as output to the input of a coding control module 2 which provides the entropy coding module 5 with control data, which provides the frames reorganization module 3 with the type of frame to be coded and which provides the coding loop 4 with the type of coding structure, namely a coding of frame or field type.

The entropy coding module 5 provides the coded video steam as output.

The coding loop 4 is a coding loop in accordance with the coding loops defined in the H.264 standard. According to other embodiments, this coding loop may obey other coding standards such as MPEG-2 for example or any other type of coding. The functions of the various modules are detailed with reference to the following figures.

Figure 2:
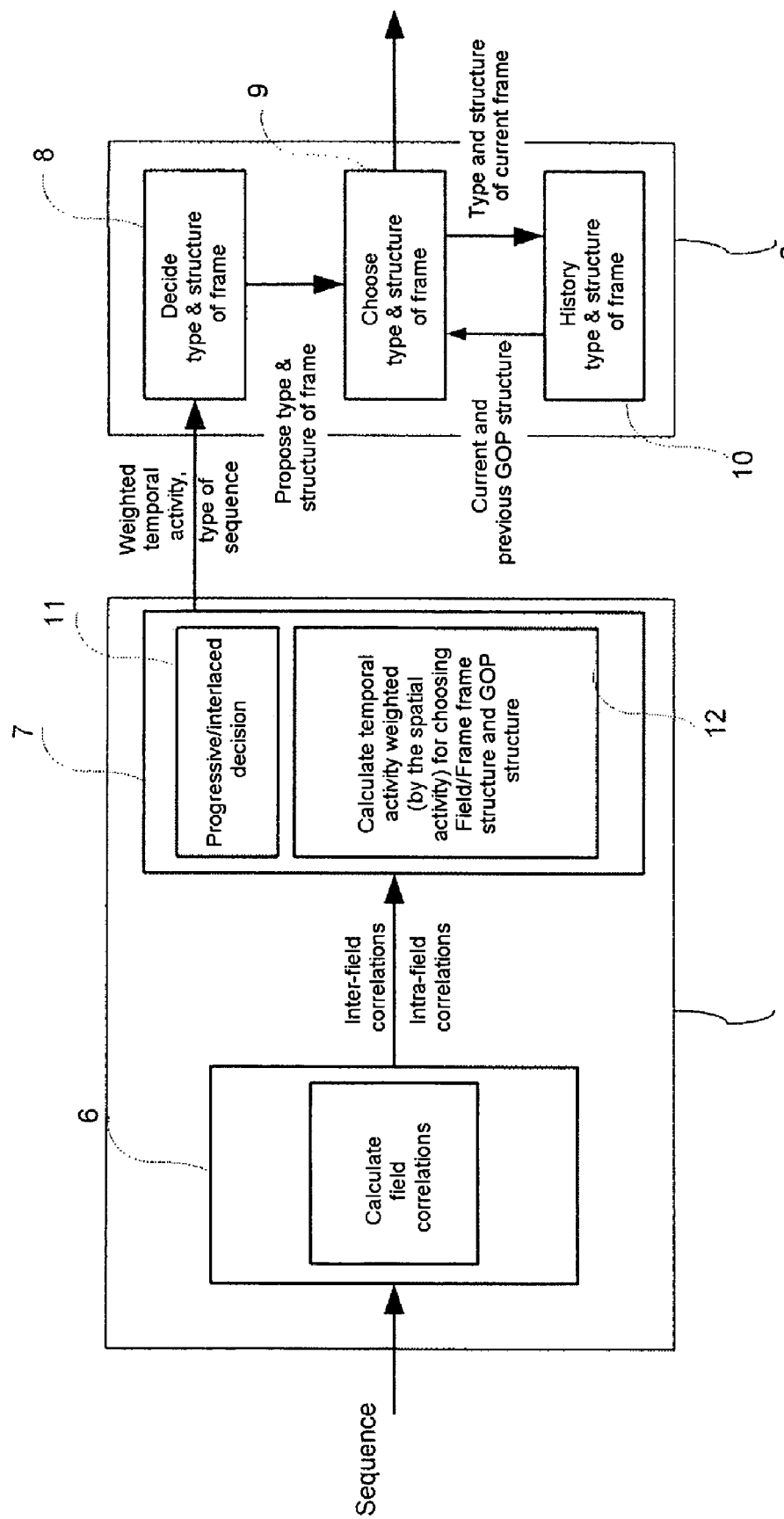
FIG. 2 represents a preferred embodiment of a functional block diagram of the invention.

FIG. 2 represents a decomposition into functional blocks of the preanalysis module 1 and coding control module 2 represented in FIG. 1.

The functional blocks represented may or may not correspond to physically distinguishable entities. For example, these modules or some of them may be grouped together into a single component or constitute functionalities of one and the same piece of software. Conversely, certain modules may possibly be composed of separate physical entities.

The modules 6 and 7 are preanalysis modules and the modules 8, 9 and 10 are modules allowing the control of coding.

The module 6 performs field correlation calculations.

Figure 3:
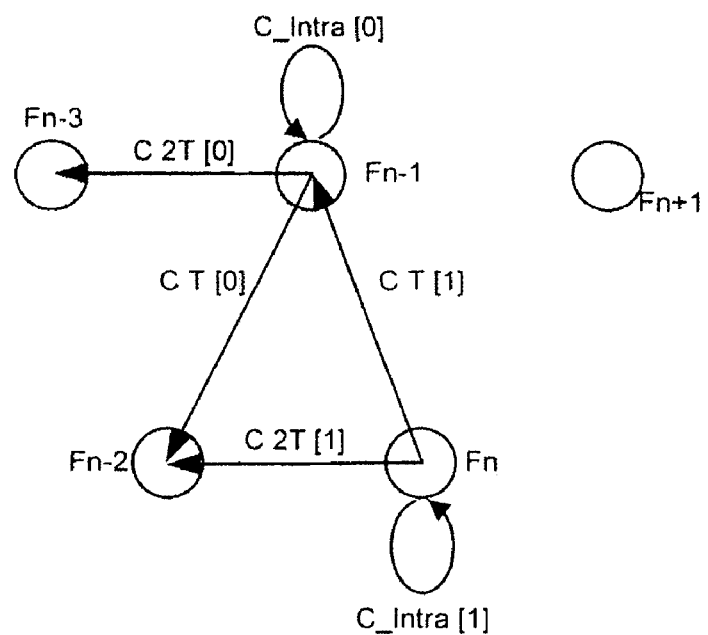
FIG. 3 represents a preferred mode of calculating the intra and inter field correlations.

FIG. 3 explains the correlation scheme used by the module 6.

The module 6 performs an evaluation of the spatial activity as indicated hereinbelow.

The module 6 performs an intra-field correlation of the current frame by measuring the intra-field correlation of each field of the frame.

The intra-field correlation of the even field is denoted CIntra[0] and the intra-field correlation of the odd field is denoted CIntra[1] as indicated in FIG. 3.

$$CIntra[0] = \sum_{j=0}^{j=nblines/2-1} \sum_{i=0}^{i=nbpels-1} |Fn_-/(j*2, i) - Fn_-/(j*2+1, i)|$$

$$CIntra[1] = \sum_{j=0}^{j=nblines/2-1} \sum_{i=0}^{i=nbpels-1} |Fn(j*2, i) - Fn(j*2+1, i)|$$

j represents the number of lines of each field, considered separately.

F represents the value of the luminance of pixel (i,j).

The module 6 performs an evaluation of the temporal activity as indicated hereinafter.

The period between two fields is denoted T. For a signal at 50 Hz, the field period is 1/50 s and in the case of a 60 Hz signal, the field period is 1/60 s.

The module 6 performs a measurement of the inter-field correlation between the first field of the current frame and the last field of the previous frame denoted C_T[0].

$$C\_T[0] = \sum_{j=0}^{j=nblines-1} \sum_{i=0}^{i=nbpels-1} |Fn_{-1}(j, i) - Fn_{-2}(j, i)|$$

The module 6 performs a measurement of the inter-field correlation between the first field of the current frame and the first field of the previous frame denoted C_2T[0].

$$C\_2T[0] = \sum_{j=0}^{j=nblines-1} \sum_{i=0}^{i=nbpels-1} |Fn_{-1}(j, i) - Fn_{-3}(j, i)|$$

The module 6 performs a measurement of the inter-field correlation between the second field of the current frame and the first field of the current frame denoted C_T[1].

$$C\_T[1] = \sum_{j=0}^{j=nblines-1} \sum_{i=0}^{i=nbpels-1} |Fn(j, i) - Fn_{-1}(j, i)|$$

The module 6 performs a measurement of the inter-field correlation between the second field of the current frame and the second field of the previous frame denoted C_2T[1].

$$C\_2T[1] = \sum_{j=0}^{j=nblines-1} \sum_{i=0}^{i=nbpels-1} |Fn(j, i) - Fn_{-2}(j, i)|$$

The module 6 provides the module 7 with the inter-field and intra-field correlation measurements.

The module 7 comprises a progressive/interlaced decision module 11 and a module 12 for calculating the weighted temporal activity.

The module 11 determines whether the current sequence received at the input of the coding device has come from a progressive source (a film for example) or from an interlaced video source.

For this purpose, it performs the following comparison: If (0.9*(C_Intra[0]+C_Intra[1])>C_T[1]), then the sequence is considered to be progressive, otherwise the sequence is considered to be interlaced.

The module 12 performs a calculation of the temporal activity weighted by the spatial activity.

The coding of frame type is appropriate for frame sequences with weak motion, that is to say frame sequences whose temporal activity is weak.

The coding of field type is appropriate, conversely, for frame sequences with strong motion, that is to say frame sequences whose temporal activity is strong.

The temporal activity is weighted by the spatial activity. Specifically, when the sequences are very textured and therefore exhibit strong spatial activity, the coding of frame type, keeping all the lines, gives better results than a coding in field mode which keeps only one line out of two.

The weighted temporal activity is calculated according to the following formula:

$$Act = \frac{1 + \min\{C\_T[0], C\_T[1]\}}{2 + 0.5 * \max\{size\_frame, (C\_int\ ra[0] + C\_int\ ra[1])\}}$$

The values 2 and 0.5 are given by way of indication and may be modified in other embodiments.

Thereafter, the coding is performed according to a field mode or a frame mode as a function of the value of Act and of the detection of the type of coding, progressive or interlaced, performed by the module 11. The choice of the coding is carried out by the module 8 which receives as input the sequence type detected and the weighted temporal activity.

If the module 11 has detected an interlaced sequence for the pair of current fields (the frame), and for the pair of previous fields, then the current frame can be coded using a coding of field type, otherwise, the current frame will be coded using a coding of frame type.

If the field coding mode is possible, then:
If Act>3, the frame is coded in field mode.
Otherwise, the frame is coded in frame mode.

In other embodiments the threshold value equal to 3 may be different. A modification of the value of the threshold may make it possible to favour one or the other of the coding modes.

Thereafter the module 8 performs the choice of the structure of the group of pictures (GOP).

If the module 8 has taken the field mode coding decision, then the GOP will include a single B frame between each P frame.

The only possible GOP structure is then $I_{0,0}\ I_{0,1}\ B_{1,0}\ B_{1,1}\ P_{2,0}\ P_{2,1}\ B_{3,0}\ B_{3,1}\ P_{4,0}\ P_{4,1}\ B_{5,0}\ B_{5,1}\ P_{6,0}\ P_{6,1}$.

where i,j in $X_{i,j}$ respectively represent the frame number and the field number. The length of the GOP is not fixed.

If the module 8 has taken the decision to code the frame in frame mode, then the number of consecutive B frames within the GOP may be greater than 1.

In this case, the module 8 calculates firstly, the optimal number of consecutive B frames by calculating the optimal I/P period $T_{I/P\ opt}$, that is to say the period between an I frame and the following P frame.

$$T_{I/P_{opt}} = 7 - 2*Act + 0.5$$

The values 7, 2 and 0.5 are given by way of indication and may be modified in other embodiments.

Thereafter the module 8 calculates the actual number of B frames:

The actual number of consecutive B frames is sometimes different from the optimal number of B frames depending on the constraints of the application. The maximum I/P period may in fact be imposed by requirements for short processing time in the coding/decoding chain.

The I/P period is thus bounded by the interval [2, max I/P period].

The value 2 corresponds to a B type frame between an I type frame and a P type frame.

The module 8 transmits the type proposal and frame structure to the final decision module 9. The module 9 also receives via the module 10 the history of decisions regarding the last few frames coded. If the structure and the type of coding of the current GOP are different from those proposed by the module 8, the module 9 will take no account of this last proposal unless the structure of the current GOP and the type of coding can be modified. In this case, one and the same GOP can contain frames coded as a field structure or as a frame structure.

According to a preferred embodiment, the GOP can be shortcut so as to make it possible to switch from a coding of field type to a coding of frame type or vice versa. In this case, each GOP possesses a coding structure, of frame or field type, and an associated GOP structure, that are constant. When there is a change of structure, then the GOP is changed by coding the first frame in intra mode. This yields high-performance coding quality and great stability and also facilitates the implementation of bit rate regulation for closed-loop coding.

Figure 4:
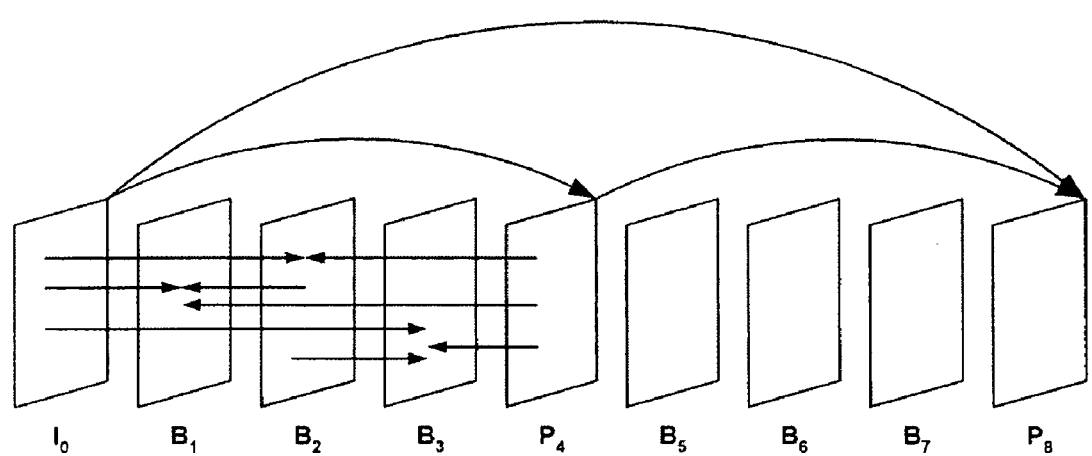
FIG. 4 represents a group of pictures (GOP) according to a preferred embodiment of the invention in the case of sequences with weak motion.

The module 9 thereafter transmits the information necessary for the coding to the frames reorganization module 3 represented in FIG. 3 and to the coding loop 4 represented in FIG. 4 as well as control data to the entropy coding module 5 represented in FIG. 5. The control data consist for example of high-level parameters indicating the entropy coding mode ("cabac" or "cavlc" under H.26L coding), the number of reference frames for the predictions, the size of the frame (width, height), the profile and the level.

More precisely, the coding control module 2 transmits the type in which the following frame should be coded (intra, bi-predictive or predictive) to the frames reorganization module 3 and transmits the structure of the frame (field or frame) to the coding loop 4.

According to a preferred embodiment of the invention, the frame of type I is always coded in field mode (with the second field of the frame coded as P type with respect to the first field), regardless of the structure and the mode of coding of the current GOP, onwards from the moment at which the sequence is considered to be of interlaced type.

According to a preferred embodiment of the invention, when the number of B frames inserted exceeds 2 (sequences with weak motion), the B frames will be used as possible reference frames for the other B frames. FIG. 4 represents an example of a group of pictures according to this preferred embodiment.

The period between an I frame and a P frame is 4, that is to say there are 3 B frames between an I frame and a P frame.

The central frame B2, lying between the other two B frames, is a reference frame for the coding of the two B frames surrounding it. This frame B2 is coded, before the frame B1, on the basis of the previous frame I0 of the current GOP and of the following frame P4 of the current GOP.

The frame B1 is coded on the basis of the previous frame I0 of the following frame B2 and of the following frame P4.

The frame B3 is coded on the basis of the frame I0, of the frame B2, of the frame P4.

The invention claimed is:

1. Device for coding video frame sequences, comprising first means for measuring the spatial activity of the video frames to be coded,
second means for measuring the temporal activity of the video frames to be coded,
means for coding the frames as a frame structure or as a field structure, said coding means being able to choose the one of the field or frame structure dynamically as a function of a quotient between the measurements of spatial and temporal activity means for determining whether the video sequences are of interlaced type or of progressive type on the basis of the measurements of spatial and temporal activity wherein, each frame comprising a first field interlaced with a second field;
the first measuring means are adapted for measuring the spatial activity of the first field of a frame and representing the same by a first value, and for measuring the spatial activity of the second field of said frame and representing the same by a second value;
the second measuring means are adapted for measuring the temporal activity between the first and second fields of said frame and representing the same by a third value; and for measuring the temporal activity between the first field of said frame and the second field of a previous frame and representing the same by fourth value; and
the coding means are adapted to compute a weighted temporal activity as follows:

$$\frac{1 + \min\{C\_T[0], C\_T[1]\}}{2 + 0.5 * \max\{size\_frame, (C\_intra[0] + C\_intra[1])\}},$$

where:
C_intra[0] is the first value;
C_intra[1] is the second value;
C_T[1] is the third value;
C_T[0] is the fourth value;
max(a,b) is a function returning the maximum value between value a and value b; and
min (a,b) is a function returning the minimum value between value a and value b.

2. Device according to claim 1, wherein the coding means chooses a field structure: 1) when an interlaced sequence is determined for said frame and for said previous frame; and 2) when the weighted temporal activity is greater than a predefined threshold; said coding means choosing a frame structure when either criteria 1 or 2 are not met.

3. Device, according to claim 1 wherein said determining means determine that said frame belongs to a progressive sequence if 0.9 multiplied by the sum of said first and second values is greater than a predetermined threshold.

4. Device according to claim 3, wherein said predetermined threshold equals the third value.

* * * * *

UNITED STATES PATENT AND TRADEMARK OFFICE
CERTIFICATE OF CORRECTION

PATENT NO.      : 7,577,196 B2                                       Page 1 of 1
APPLICATION NO. : 10/884158
DATED           : August 18, 2009
INVENTOR(S)     : Ducloux et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 914 days.

Signed and Sealed this

Seventh Day of September, 2010

David J. Kappos
*Director of the United States Patent and Trademark Office*